(12) United States Patent
Fetters et al.

(10) Patent No.: US 11,458,785 B2
(45) Date of Patent: Oct. 4, 2022

(54) VALVE STEM CAP ASSEMBLY

(71) Applicants: Kenneth Fetters, Lake Elsinore, CA (US); Meagan Fosdick, Lake Elsinore, CA (US)

(72) Inventors: Kenneth Fetters, Lake Elsinore, CA (US); Meagan Fosdick, Lake Elsinore, CA (US)

( * ) Notice: Subject to any disclaimer, the term of this patent is extended or adjusted under 35 U.S.C. 154(b) by 278 days.

(21) Appl. No.: 16/899,022

(22) Filed: Jun. 11, 2020

(65) Prior Publication Data
US 2021/0387490 A1    Dec. 16, 2021

(51) Int. Cl.
*B60C 29/06*    (2006.01)
(52) U.S. Cl.
CPC ................... *B60C 29/066* (2013.01)
(58) Field of Classification Search
CPC ... B60C 29/066; B60C 29/06; Y10T 137/374; Y10T 137/3724
USPC ...... 138/89.1–89.4; 251/149.6; 137/231, 232
See application file for complete search history.

(56) References Cited

U.S. PATENT DOCUMENTS

| 577,122 A | 2/1897 | Washburn | |
| 1,966,506 A * | 7/1934 | Knudsen | B60C 29/066 220/291 |
| 2,244,465 A | 6/1941 | Lippe | |
| 2,963,046 A | 12/1960 | Goodrich | |
| 4,004,614 A * | 1/1977 | Mackal | F16K 15/202 137/232 |
| 4,239,184 A * | 12/1980 | Dudar | B60C 29/066 137/232 |
| D305,222 S | 12/1989 | Geib | |
| 5,195,561 A | 3/1993 | Wilson | |
| 5,417,247 A | 5/1995 | Tarui | |
| 6,119,714 A * | 9/2000 | Otzen | B60C 23/0496 137/232 |
| 6,196,254 B1 * | 3/2001 | Shaw | B60C 29/06 137/231 |
| 8,733,161 B1 | 5/2014 | Decal | |
| 9,115,823 B1 * | 8/2015 | Smith | F16K 51/00 |
| 2005/0023238 A1 * | 2/2005 | Wong | B65D 55/16 220/291 |
| 2008/0196768 A1 * | 8/2008 | Steffan | F16L 55/115 137/232 |
| 2021/0190227 A1 * | 6/2021 | Correll | B60C 29/066 |

FOREIGN PATENT DOCUMENTS

DE    2516529 A  * 10/1975 ........... B60C 29/066

* cited by examiner

*Primary Examiner* — Patrick F Brinson

(57) ABSTRACT

A valve stem cap assembly for inhibiting a valve stem cap from being lost when the valve stem cap is removed from a valve stem includes a cap that is threadable onto a valve stem of an inflatable tire. In this way the cap inhibits debris from collecting in the valve stem. A tether is rotatably coupled between the cap and the valve stem. In this way the tether inhibits the cap from being lost when the cap is removed from the valve stem.

4 Claims, 5 Drawing Sheets

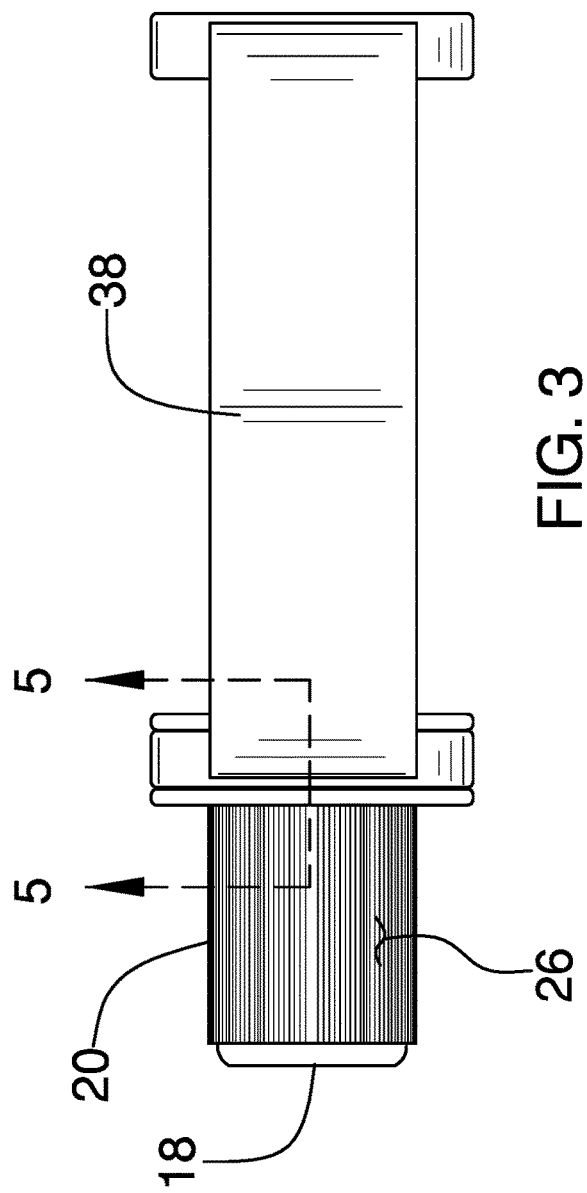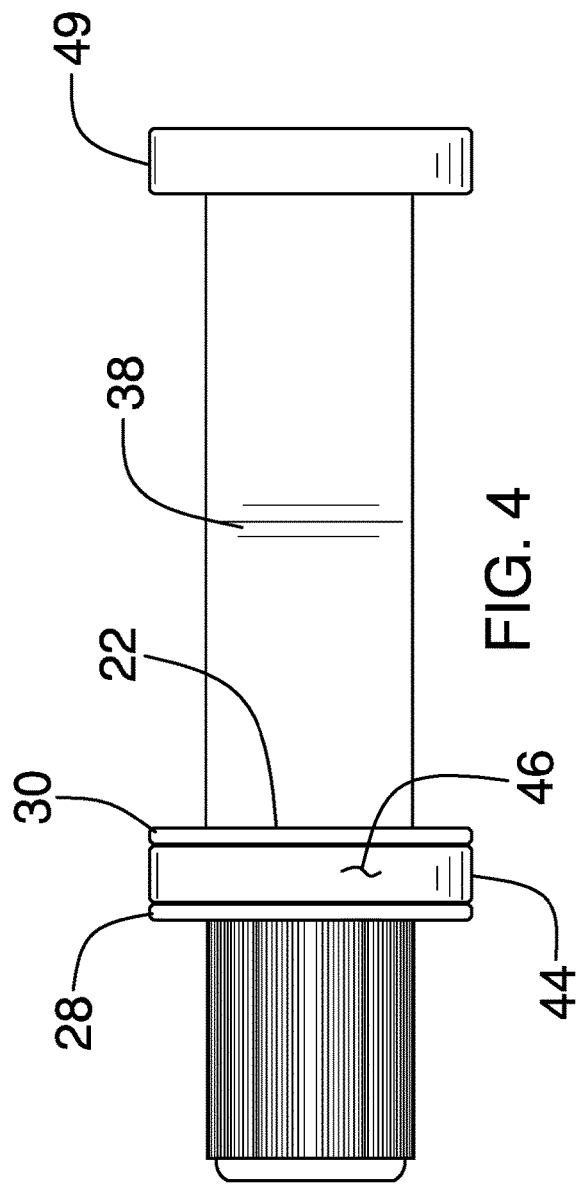

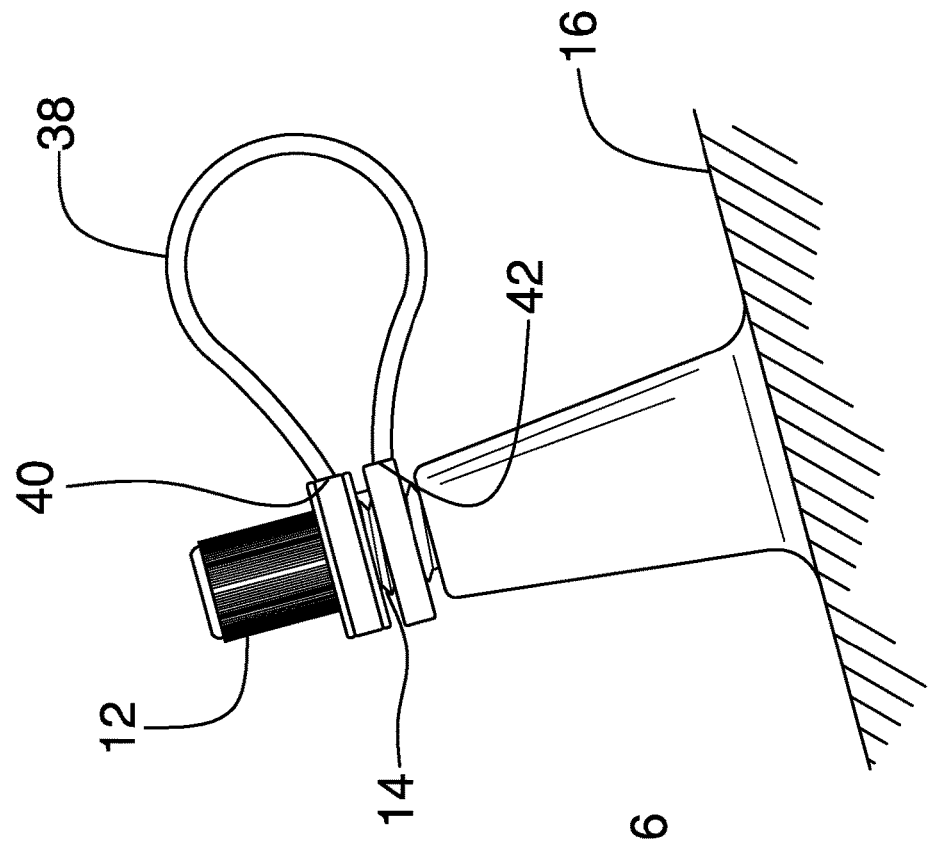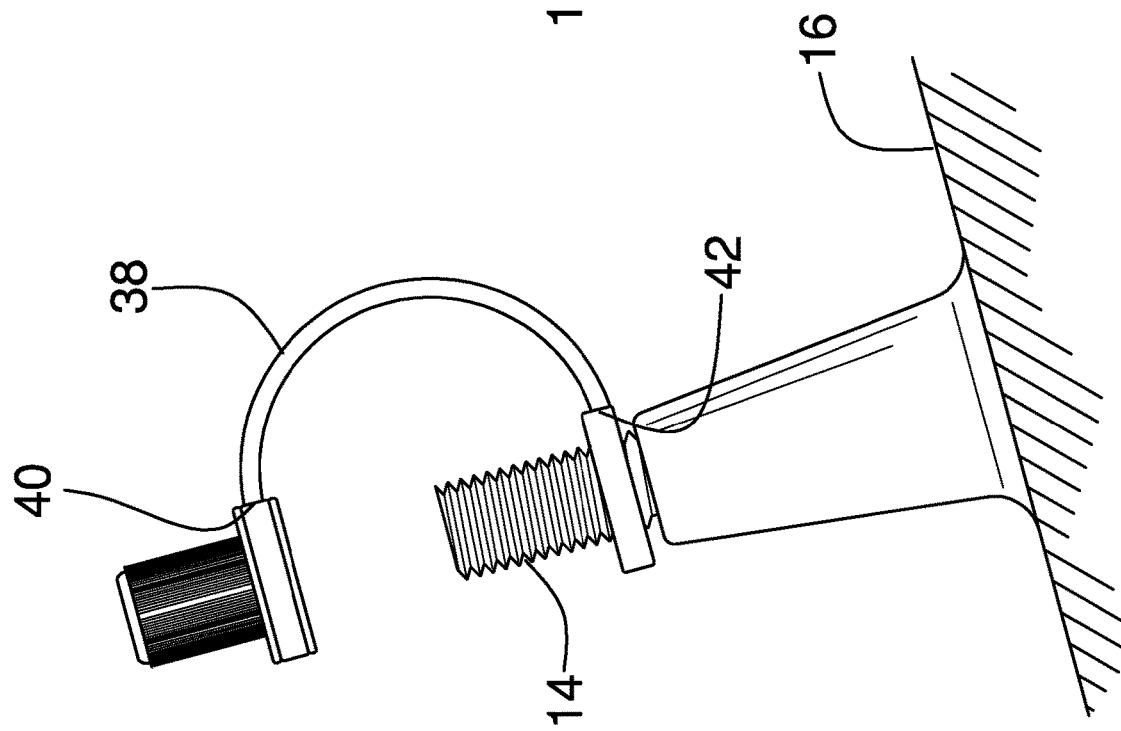

VALVE STEM CAP ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to valve stem cap devices and more particularly pertains to a new valve stem cap device for inhibiting a valve stem cap from being lost when the valve stem cap is removed from a valve stem.

(2) Description of Related Art Including Information Disclosed Under 37 CFR 1.97 and 1.98

The prior art relates to valve stem cap devices including a valve stem cap that includes a rod that slidably engages the valve stem for inhibiting the valve stem cap from being lost. The prior art discloses a variety of valve stem caps that include a rigid member that engages a valve stem to inhibit the valve stem caps from being lost. The prior art discloses a valve stem cap that includes a flexible retaining member that can be wrapped around a spoke of a wheel for inhibiting the valve stem cap from being lost. The prior art discloses a rubber cap for a hydraulic fitting which includes a flexible member that encircles the hydraulic fitting for inhibiting the rubber cap from being lost.

BRIEF SUMMARY OF THE INVENTION

An embodiment of the disclosure meets the needs presented above by generally comprising a cap that is threadable onto a valve stem of an inflatable tire. In this way the cap inhibits debris from collecting in the valve stem. A tether is rotatably coupled between the cap and the valve stem. In this way the tether inhibits the cap from being lost when the cap is removed from the valve stem.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 3 is a back view of an embodiment of the disclosure.

FIG. 4 is a front view of an embodiment of the disclosure.

FIG. 6*a* is a perspective in-use view of an embodiment of the disclosure showing a cap being removed from a valve stem.

FIG. 6*b* is a perspective in-use view of an embodiment of the disclosure showing a cap being installed on a valve stem.

DETAILED DESCRIPTION OF THE INVENTION

Figure 1:
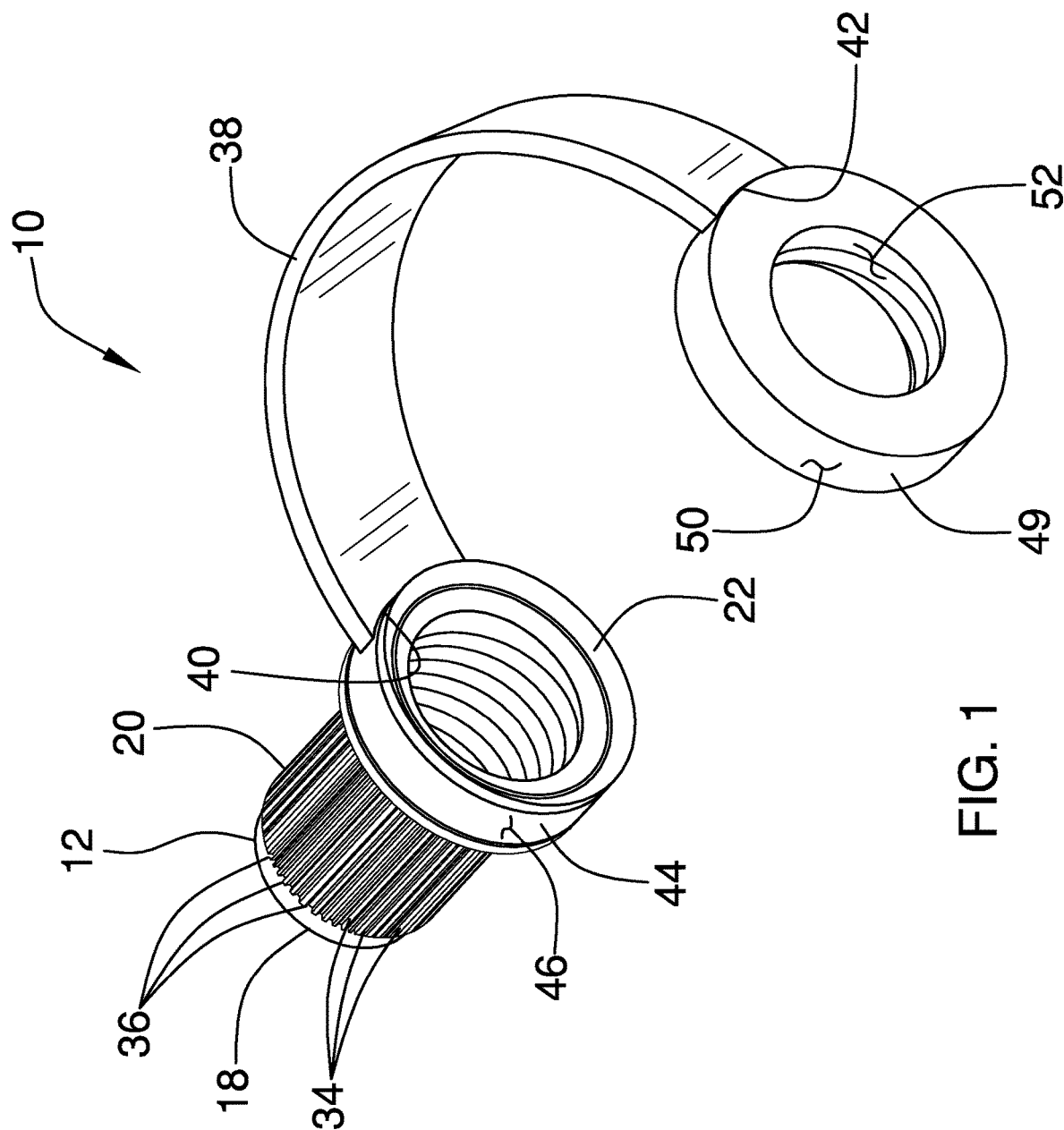
FIG. 1 is a perspective view of a valve stem cap assembly according to an embodiment of the disclosure.
Figure 2:
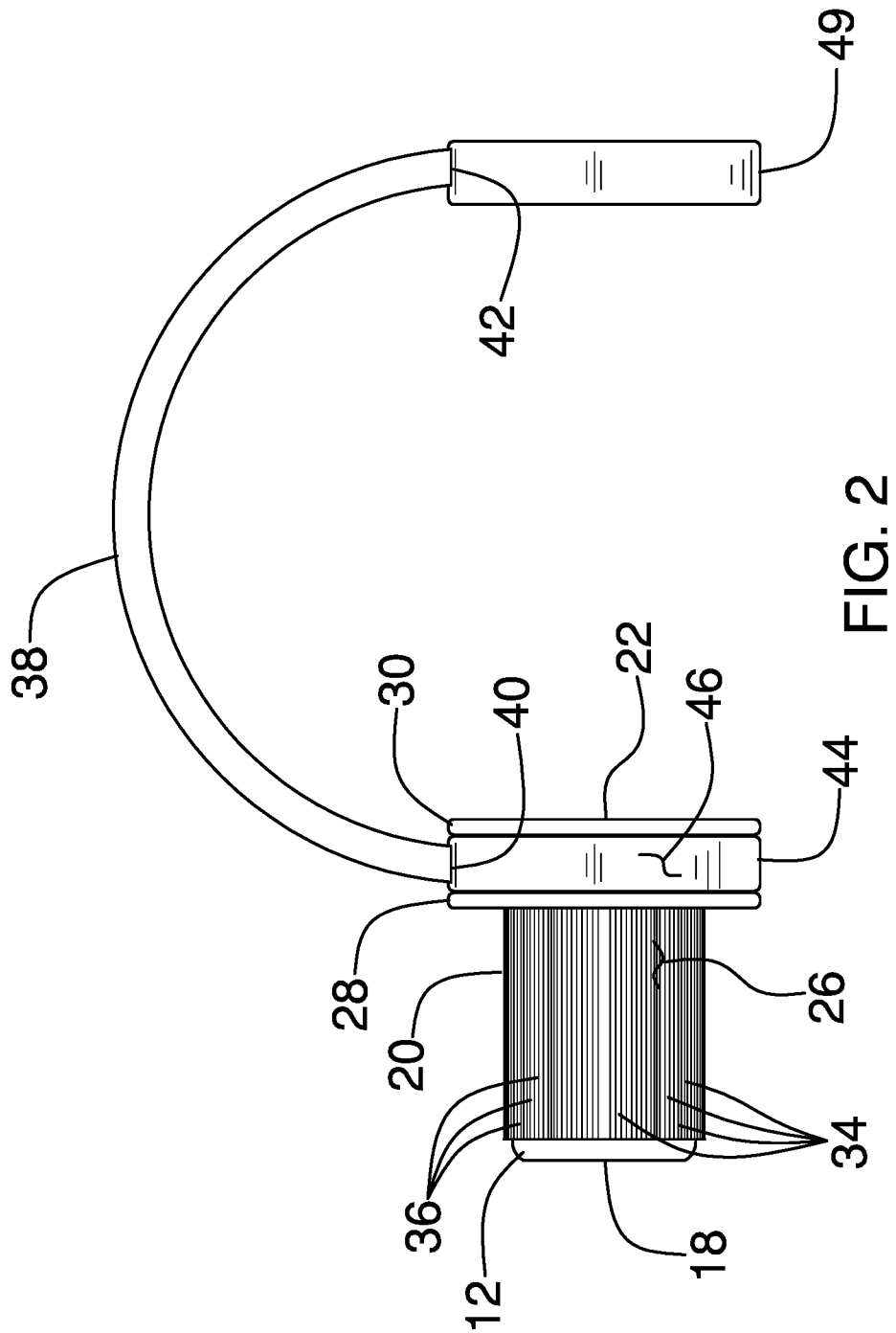
FIG. 2 is a right side view of an embodiment of the disclosure.
Figure 5:
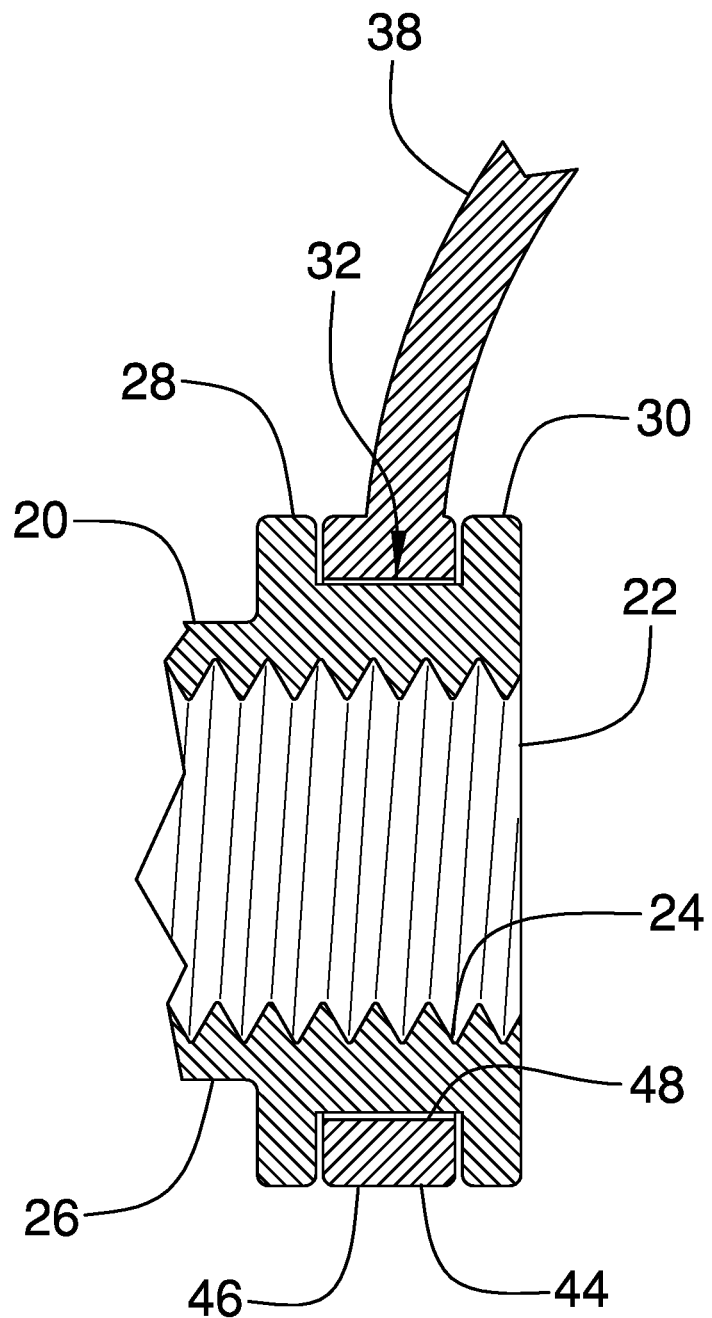
FIG. 5 is a cross sectional view taken along line 5-5 of FIG. 3 of an embodiment of the disclosure.

With reference now to the drawings, and in particular to FIGS. 1 through 6*b* thereof, a new valve stem cap device embodying the principles and concepts of an embodiment of the disclosure and generally designated by the reference numeral 10 will be described.

As is best illustrated in FIGS. 1 through 6*b*, the valve stem cap assembly 10 generally comprises a cap 12 that is threadable onto a valve stem 14 of an inflatable tire 16. In this way the cap 12 inhibits debris from collecting in the valve stem 14. The inflatable tire 16 may be a tubeless tire that is common to motor vehicles or any other similar type of inflatable tire. The cap 12 has a top wall 18 and an outer wall 20 extending away therefrom, and the outer wall 20 is continuously arcuate about a center point of the top wall 18 such that the cap 12 has a cylindrical shape.

The outer wall 20 has a distal edge 22 with respect to the top wall 18 to define an opening 23 into the cap 12, and the outer wall 20 has an inside surface 24 and an outside surface 26. The inside surface 24 is threaded thereby facilitating the inside surface 24 to threadably engage the valve stem 14. The outside surface 26 has a first lip 28 extending outwardly therefrom and the first lip 28 extends around a full circumference of the outside surface 26. Additionally, the outside surface 26 has a second lip 30 extending outwardly therefrom. The second lip 30 is aligned with and is coextensive with the distal edge 22 of the outer wall 20 thereby defining a space 32 between the first lip 28 and the second lip 30.

The outside surface 26 has a plurality of depressions 34 each extending toward the inside surface 24. Each of the depressions 34 extends between the top wall 18 and the first lip 28. Moreover, the depressions 34 are spaced apart from each other and are distributed between the top wall 18 and the lip. The depressions 34 define a plurality of ridges 36 between the depressions 34 for enhancing gripping the cap 12 when removing or installing the cap 12 on the valve stem 14.

A tether 38 is provided that is rotatably coupled to the cap 12, and the tether 38 has a first end 40 and a second end 42. The tether 38 is comprised of a deformable material such as rubber or the like. A first ring 44 is provided that has an outer surface 46 and an inner surface 48, and the first end 40 of the tether 38 is coupled to the outer surface 46. The first ring 44 is positioned in the space 32 between the first lip 28 and the second lip 30 having the inner surface 48 resting against the outside surface 26 of the outer wall 20 of the cap 12. The first ring 44 is rotatable around the cap 12 thereby facilitating the cap 12 to be rotated without rotating the tether 38. The first ring 44 is comprised of a resiliently stretchable material such as rubber or the like. In this way the first ring 44 can be stretched for removing the first ring 44 from the cap 12.

A second ring 49 is provided that has an outermost surface 50 and an innermost surface 52. The second end 42 of the tether 38 is coupled to the outermost surface 50 of the second ring 49. The innermost surface 52 is threaded thereby facilitating the second ring 49 to be threaded onto the valve stem 14. In this way the tether 38 inhibits the cap 12 from being lost when the cap 12 is removed from the valve stem 14. The second ring 49 may be comprised of a resiliently stretchable material such as rubber or the like.

In use, the second ring 49 is fully threaded onto the valve stem 14 thereby facilitating the tether 38 to be coupled to the valve stem 14. In this way the cap 12 is retained near the valve stem 14 thereby inhibiting the cap 12 from being lost. The cap 12 can be threaded onto or off of the valve stem 14 without rotating the tether 38. In this way the tether 38 does not inhibit the cap 12 from being removed or installed onto the valve stem 14.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A valve stem cap assembly being tethered to a valve stem, said assembly comprising:

a cap being threadable onto a valve stem of an inflatable tire wherein said cap is configured to inhibit debris from collecting in the valve stem, wherein said cap has a top wall and an outer wall extending away therefrom, said outer wall being continuously arcuate about a center point of said top wall such that said cap has a cylindrical shape, said outer wall having a distal edge with respect to said top wall to define an opening into said cap, said outer wall having an inside surface and an outside surface, said inside surface being threaded thereby facilitating said inside surface to threadably engage the valve stem;

a tether being rotatably coupled between said cap and the valve stem wherein said tether is configured to inhibit said cap from being lost when said cap is removed from the valve stem, said tether having a first end and a second end;

a first ring having an outer surface and an inner surface, said outer surface having said first end of said tether being coupled thereto, said first ring being coupled said cap, said first ring being rotatable around said cap thereby facilitating said cap to be rotated without rotating said tether;

wherein said outside surface has a first lip extending outwardly therefrom, said first lip extending around a full circumference of said outside surface;

wherein said outside surface has a second lip extending outwardly therefrom, said second lip being aligned with and being coextensive with said distal edge of said outer wall thereby defining a space between said first lip and said second lip, said first ring being positioned between said first lip and said second lip; and wherein said first ring has a width complementary to a space between said first lip and said second lip, said outer surface of said first ring being flush with an outermost peripheral edge of each of said first lip and said second lip.

2. The assembly according to claim 1, wherein said outside surface has a plurality of depressions each extending toward said inside surface, each of said depressions extending between said top wall and said first lip, said. depressions being spaced apart from each other and being distributed between said top wall and said lip for enhancing gripping said cap.

3. The assembly according to claim 1, further comprising a second ring having an outermost surface and an innermost surface, said outermost surface having said second end of said tether being coupled thereto, said innermost surface being threaded thereby facilitating said second ring to be threaded onto the valve stem.

4. A valve stem cap assembly being tethered to a valve stem, said assembly comprising:

a cap being threadable onto a. valve stem of an inflatable tire wherein said cap is configured to inhibit debris from collecting in the valve stem, said cap having a top wall and an outer wall extending away therefrom, said outer wall being continuously arcuate about a center point of said top wall such that said cap has a cylindrical shape, said outer wall having a distal edge with respect to said top wall to define an opening into said cap, said outer wall having an inside surface and an outside surface, said inside surface being threaded thereby facilitating said inside surface to threadably engage the valve stem, said outside surface having a first lip extending outwardly therefrom, said first lip extending around a full circumference of said outside surface, said outside surface having a second lip extending outwardly therefrom, said second lip being aligned with and being coextensive with said distal edge of said outer wall thereby defining a space between said first lip and said second lip, said outside surface having a plurality of depressions each extending toward said inside surface, each of said depressions extending between said top wall and said first lip, said depressions being spaced apart from each other and being distributed between said top wall and said lip for enhancing gripping said cap;

a tether being rotatably coupled to said cap, said tether having a first end and a second end;

a first ring having an outer surface and an inner surface, said outer surface having said first end of said tether being coupled thereto, said first ring being positioned in said space between said first lip and said second lip having said inner surface resting against said outside surface of said outer wall of said cap, said first ring being rotatable around said cap thereby facilitating said cap to be rotated without rotating said tether;

a second ring having an outermost surface and an innermost surface, said outermost surface having said second end of said tether being coupled thereto, said innermost surface being threaded thereby facilitating said second ring to be threaded onto the valve stem wherein said tether is configured to inhibit. the cap from being lost when said cap is removed from the valve stem; and wherein said first ring has a width complementary to a space between said first lip and said second lip, said outer surface of said first ring being flush with an outermost peripheral edge of each of said first lip and said second lip.

* * * * *